US008093542B2

(12) United States Patent
Lin

(10) Patent No.: US 8,093,542 B2
(45) Date of Patent: Jan. 10, 2012

(54) IMAGING MODULE FOR A PROJECTION SYSTEM HAVING AN EXTENDED LENS DEVICE ROTATABLE FROM A FIRST DIRECTION TO ONE OF A SECOND AND A THIRD DIRECTION FOR SELECTIVELY PROJECTING IMAGE ONTO A SCREEN

(75) Inventor: Hung-Ying Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 358 days.

(21) Appl. No.: 12/556,800

(22) Filed: Sep. 10, 2009

(65) Prior Publication Data

US 2010/0066986 A1    Mar. 18, 2010

(30) Foreign Application Priority Data

Sep. 15, 2008   (TW) ................. 97135346 A

(51) Int. Cl.
*H01L 27/00* (2006.01)
(52) U.S. Cl. ...................................... 250/208.1; 353/101
(58) Field of Classification Search .................. 250/216, 250/239, 208.1; 353/96, 101, 119; 359/808
See application file for complete search history.

(56) References Cited

U.S. PATENT DOCUMENTS 5,223,870 A * 6/1993 Ozeki ............................ 353/95

FOREIGN PATENT DOCUMENTS

| JP | 2002-90879 | 3/2002 |
| JP | 2005-24573 | 1/2005 |

OTHER PUBLICATIONS

Office Action from corresponding Chinese Application No. 200810213169.X dated Jul. 26, 2010.

* cited by examiner

*Primary Examiner* — Que T Le
(74) *Attorney, Agent, or Firm* — Grossman, Tucker, Perreault & Pfleger, PLLC

(57) ABSTRACT

The invention provides an imaging module disposed on a projection system. The imaging module comprises an extended lens device, which connects to the image outlet of the body of the projection system by a rotation mechanism. By rotating the rotation mechanism, the projection system may optionally project images through the extending lens device onto the screen in two perpendicular directions, of which the image ratio of the two images are reciprocal.

14 Claims, 5 Drawing Sheets

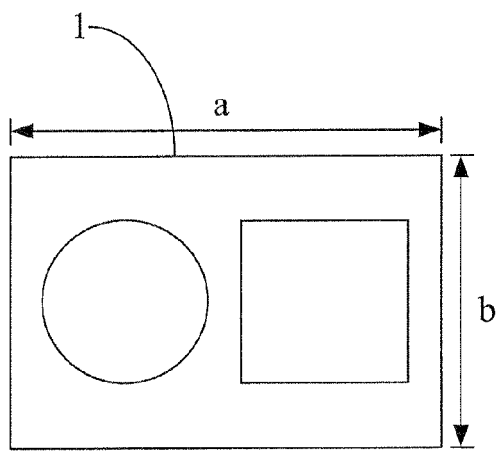
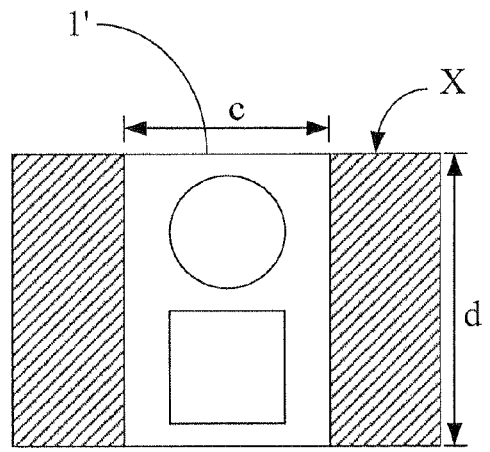
FIG. 1A
(Prior Art)
FIG. 1B
(Prior Art)
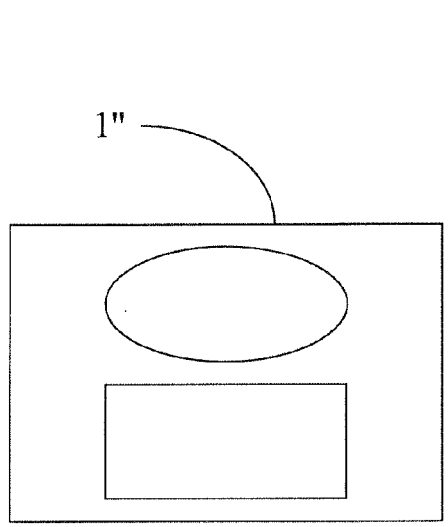
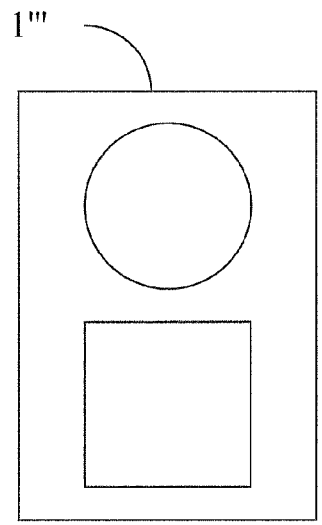
FIG. 1C
(Prior Art)
FIG. 1D
(Prior Art)

IMAGING MODULE FOR A PROJECTION SYSTEM HAVING AN EXTENDED LENS DEVICE ROTATABLE FROM A FIRST DIRECTION TO ONE OF A SECOND AND A THIRD DIRECTION FOR SELECTIVELY PROJECTING IMAGE ONTO A SCREEN

This application claims priority to Taiwan Patent Application No. 097135346 filed on Sep. 15, 2008, the disclosure of which is incorporated herein by reference in its entirety.

CROSS-REFERENCES TO RELATED APPLICATIONS

Not applicable.

BACKGROUND OF THE INVENTION

1. Field of the Invention

The present invention provides an imaging module disposed on a projection system to project an image at an appropriate display ratio.

2. Descriptions of the Related Art

With the advancement of information technology and increase in digital data, digital devices for displaying digital data have also been rapidly developing. For example, projection systems have been created to receive digital data input from an external digital device and project a larger image for easier viewing. In some cases, projection systems may further provide a richer entertainment experience, such as being used to project video games or movie pictures. Thus, projection systems have become popular display apparatuses that are commonly applied to digital devices.

Generally, digital data is set to be displayed at a specific display ratio. Digital data is mostly displayed at a display ratio (i.e., a ratio of a horizontal length to a vertical width of an image corresponding to the digital data) of 4:3 or 16:9. However, depending on the requirements of the user in creating or recording digital data, digital data (especially in the case of an image pattern) transmitted from a digital device often has to be rotated 90° before being played. For example, an original display ratio of 4:3 or 16:9 would need to be changed to a new display ratio of 3:4 or 9:16. But due to the limitation of output modes of digital devices, the length and width of the image pattern will be scaled down at equal ratios, which inevitably compromise the magnified display result of the projection system.

For example, as shown in FIGS. 1A and 1B, a projection system projects digital data with a display ratio of 4:3 as the first image 1. In this case, to display the first image 1 on a projection screen at a size as large as possible, the projection system magnifies the length and width thereof to a first length a and a first width b (as shown in FIG. 1A) which corresponds to the magnification limits of the projection system at a given location (i.e., the first image 1 is adapted to cover the entire projection screen without any spare display areas remaining on the screen). On the other hand, when the first image 1 is rotated 90° for projection as a second image 1' with a display ratio of 3:4 due to the limitation of the internal magnification mechanism of the projection system, the first width b is used as a second width d of the second image 1' while a second length c of the second image 1' is scaled down accordingly as shown in FIG. 1B. Consequently, the magnification factor of the second image 1' is much smaller than that of the first image 1. Meanwhile, because the second image 1' is projected on a central area of the visible range of the projection screen X, shadows (as shown by the hatched portions in FIG. 1B) will appear in areas at both the left and the right sides of the projection screen X, making it impossible to obtain a desirable projection effect for the image pattern. However, to sufficiently use the magnification capacity of the projection system, the second image 1' with the display ratio of 3:4 would be modified by a software to fill up the projection screen with a ratio of 4:3, i.e., the first image 1 would be rotated 90° while still maintaining the original display ratio of 4:3 as shown in FIG. 1C, while the second image 1' would be extended in the lateral direction to form a deformed third image 1", leading to an incorrect display ratio and consequently a degraded viewing effect of the image. Another way to solve this problem is to directly change the orientation in which the projection system is positioned to overcome the limitation of the magnification mechanism. For instance, the projection system originally positioned in the horizontal orientation may be rotated to a vertical orientation to project a fourth image 1'" that is rotated 90° accordingly as shown in FIG. 1D, thus obtaining an image with a display ratio reciprocal to the original display ratio. However, to project images of the original display ratio again, the user has to revert the projection system to the original horizontal orientation, which is inconvenient and makes the projection system unstable due to the small seating area in the vertical orientation. Besides the inconvenience and instability associated with changing the positioning orientation of the projection system, the bulb of the projection system needs to also be used at a particular angle. An improper rotation of the projection system may cause shortened service life of or damage to the wick. Moreover, this also has an adverse influence on heat dissipation in the projection system. More specifically, the thermal module inside the projection system is designed according to the original positioning orientation of the projection system, so the air flows from the fan in a certain direction determined by the vent holes formed in the housing of the projection system. Unfortunately, rotating the positioning orientation of the projection system might block the vent holes, which compromise the effect of forced convection provided by the cooling fan, thus causing poor heat dissipation. Consequently, because waste heat generated by components inside the projection system (especially the bulb) cannot be dissipated out of the projection system successfully and effectively, the accumulation of the waste heat within the projection system might damage to the projection system and shorten the service life thereof. Therefore, the abovementioned practice for adjusting images is infeasible.

It follows from the above description that when an image pattern from an existing digital device is to be rotated 90° before being projected via a projection system, the length and width of the image must be scaled down at equal ratios to keep the original display ratio of the image pattern. However, no effective solutions have been provided to increase the magnification factor of the image. Accordingly, it is important to develop a projection system that provides an increased magnification factor under normal use conditions while still maintaining the original display ratio (mostly of 3:4 or 9:16) of the projected image.

SUMMARY OF THE INVENTION

An objective of this invention is to provide an imaging module disposed on a projection system for the projection system to project images with display ratios reciprocal to each other. The projection system has a body and an image outlet formed on the body so the projection system can project an image from the image outlet of the body along a first direction. The imaging module comprises an extended lens device rotatably connected to the image outlet to receive the image therefrom. The extended lens device is further capable of rotating around the first direction with respect to the body to either a second direction or a third direction corresponding to a second direction and a third direction respectively, and selectively projecting the image onto a screen along the second direction or the third direction. The directions are substantially perpendicular to each other.

With the above projection mechanism, images with display ratios reciprocal to each other can be projected along the second direction and the third direction respectively. Hence, such a projection system overcomes the shortcomings and disadvantages of conventional practices. In other words, such a projection system not only project images with common display ratios of 4:3 and 16:9, but also allows the user to preferably obtain images with display ratios of 3:4 and 9:16 and a larger magnification factor.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1A illustrates a projection image;

FIG. 1B illustrates a projection image that is rotated 90° with respect to the projection image of FIG. 1A and has a scaled-down size;

FIG. 1C illustrates a projection image that is extended in the lateral direction on the basis of the projection image of FIG. 1B;

FIG. 1D illustrates a projection image obtained from directly rotating the projection image of FIG. 1A by 90°;

DESCRIPTION OF THE PREFERRED EMBODIMENT

Figure 2:
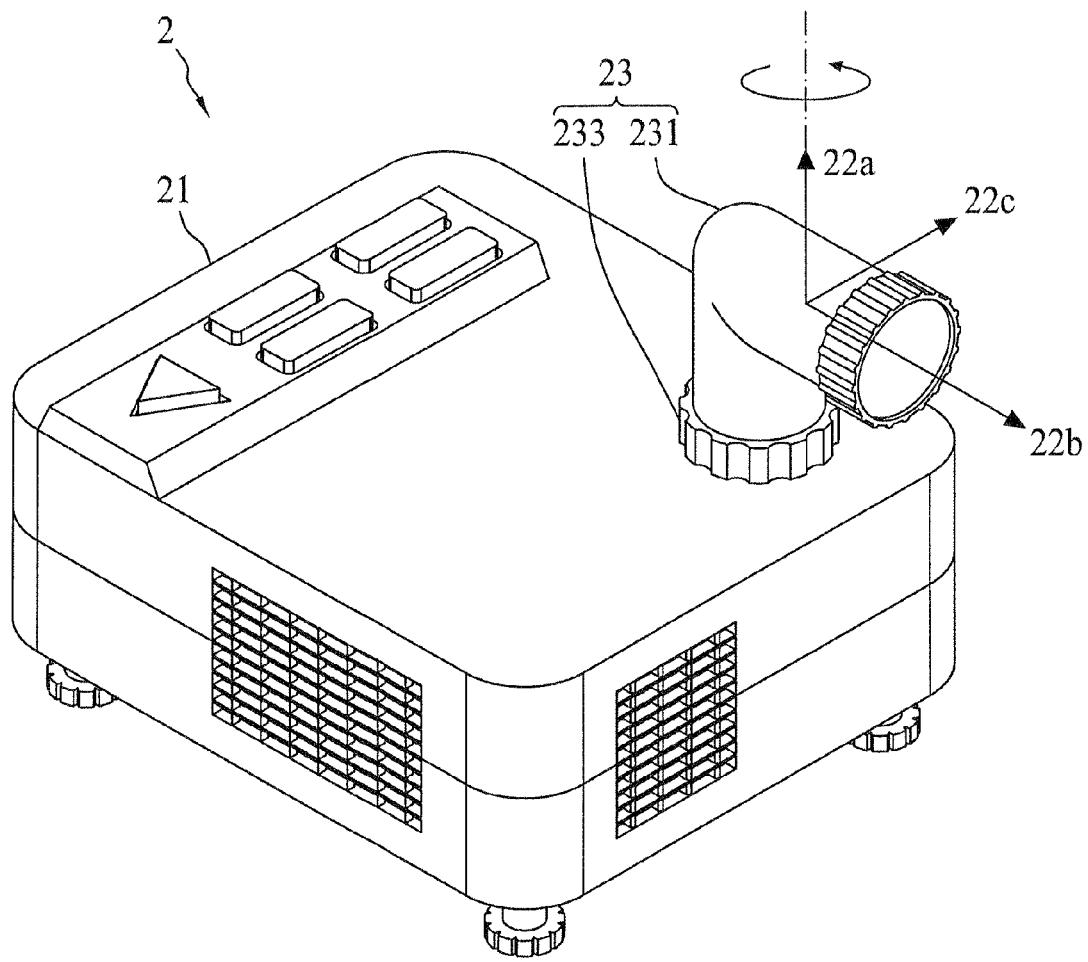
FIG. 2 is a schematic perspective view of a projection system according to the first embodiment of this invention.

The first embodiment of this invention is a projection system 2, schematic views of which are shown in FIGS. 2, 3A, 3B and 3C. The projection system 2 comprises a body 21, an imaging module 23, an imaging device 25, and an image outlet (not shown) disposed on the body 21. The projection system 2 is adapted to receive data input from an external digital device (e.g., a television, a computer, a notebook computer, a DVD player or a digital camera). By processing the data, the projection system 2 generates an image (not shown) for projection from the image outlet of the body 21 along a first direction 22a.

The imaging module 23 comprises an extended lens device 231 and a rotation mechanism 233. The rotation mechanism 233 is disposed between the body 21 and the extended lens device 231 so that the extended lens device 231 is rotatably disposed on the image outlet and connected with the body 21. Thus, the extended lens device 231 is adapted to rotate around the first direction 22a between a first and a second position with respect to the body 21. It should be noted that the first position corresponds to a second direction 22b, while the second position corresponds to a third direction 22c. In this way, the extended lens device 231 may receive an image from the image outlet projected along the first direction 22a, and project the image to a screen (not shown) selectively along either the second direction 22b or the third direction 22c for viewing. Any two of the first direction 22a, the second direction 22b and the third direction 22c are substantially perpendicular to each other. Additionally, the image has a first image ratio, a second image ratio and a third image ratio when being projected along the first direction 22a, the second direction 22b and the third direction 22c respectively, in which the first image ratio is substantially equal to either the second or the third image ratios and reciprocal to the other.

Figure 3A:
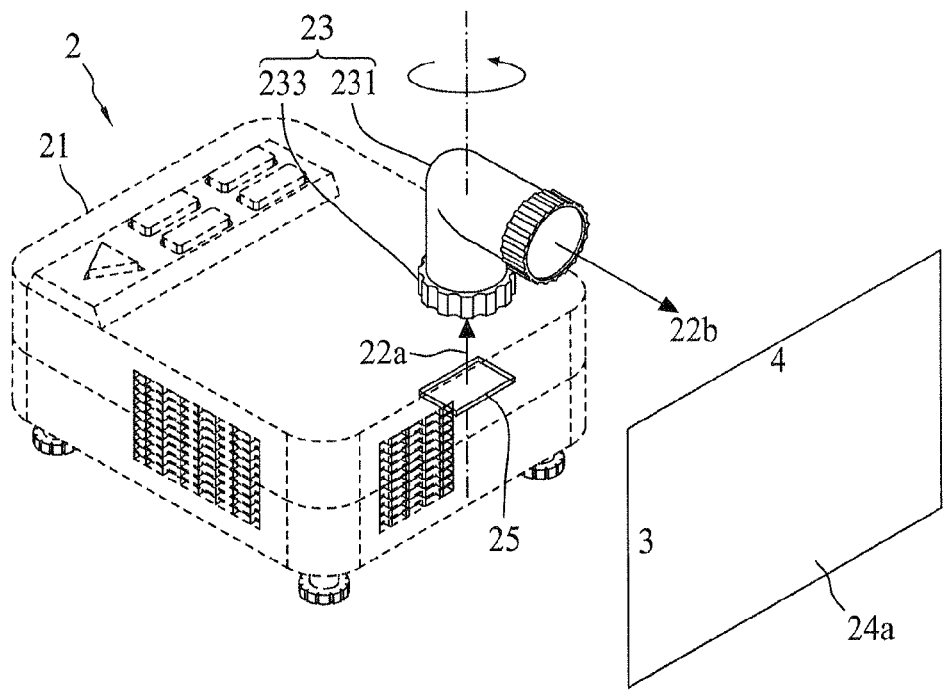
FIG. 3A is a schematic view illustrating a way in which an extended lens device of the first embodiment projects an image.
Figure 3B:
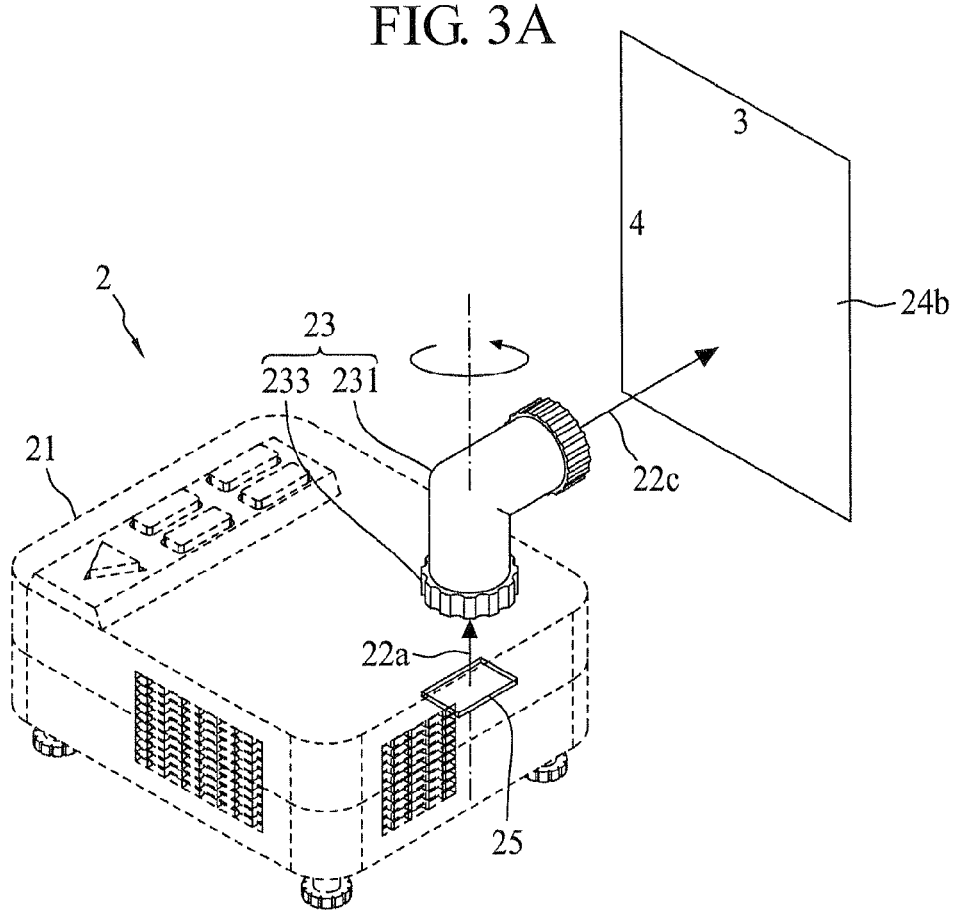
FIG. 3B is a schematic view illustrating another way in which the extended lens device of the first embodiment projects an image.
Figure 3C:
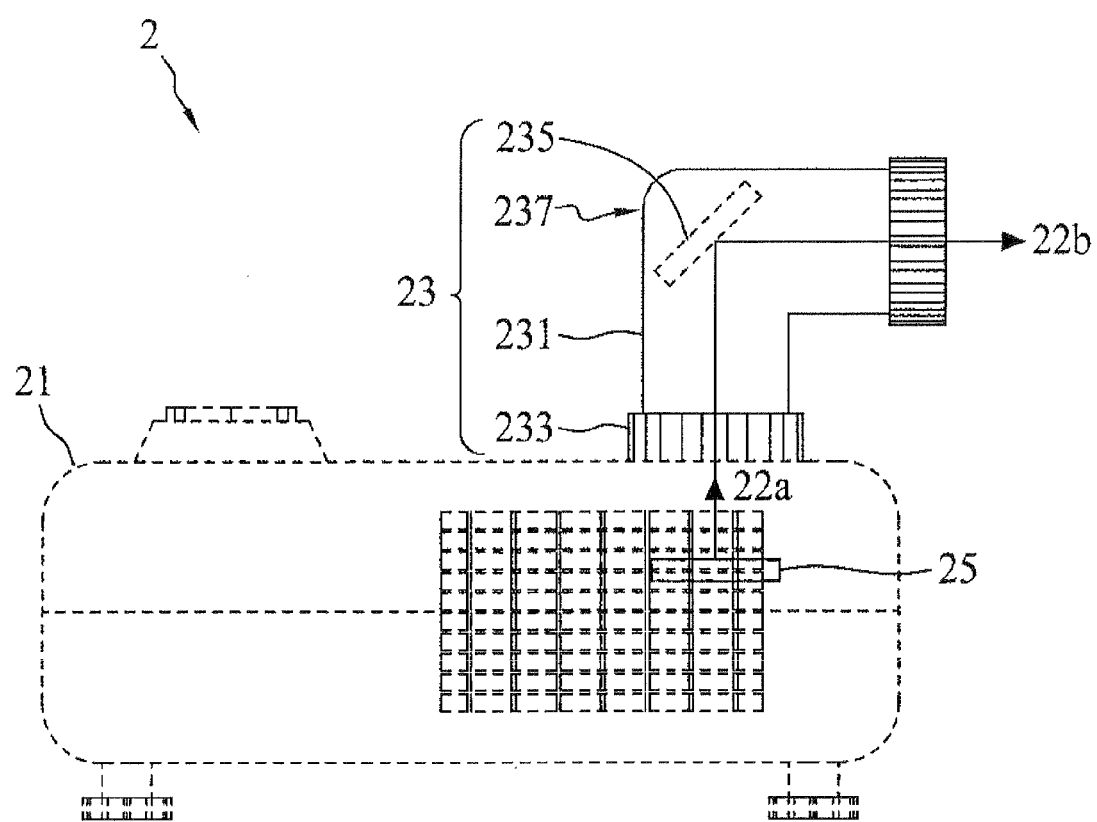
FIG. 3C is a schematic view illustrating parts of the components and the structures of a projection system according to the first embodiment of this invention.

In reference to FIGS. 3A, 3B and 3C together, only parts of the projection system are depicted therein. For ease of understanding, the body 21 of the projection system 2 is shown in broken lines while individual components are shown in a schematic way but not in scale to actual dimensions and profiles. Additionally, the numerals 3, 4 labeled in the second image 24a and the third image 24b of FIGS. 3A and 3B refer to the aspect ratio of the second image 24a and the third image 24b, but do not specify any particular dimensions. As shown, the extended lens device 231 of the imaging module 23 comprises a reflection component 235, a turning structure 237 and at least one lens (not shown). With the turning structure 237, the extended lens device 231 turns from the first direction 22a to another direction perpendicular to the first direction 22a (e.g., the second direction 22b or the third direction 22c) to present a structure that forms an included angle of 90°. The reflection component 235, which is disposed inside the turning structure 237 of the extended lens device 231, reflects an image from the first direction 22a to the second direction 22b or the third direction 22c depending on whether the extended lens device 231 stays at the first position or the second position. In this embodiment, the reflection component 235 is a reflection mirror. However, in other embodiments, the reflection component may also be a prism. In this embodiment, the imaging device 25 is a digital micromirror device (DMD) for use in a digital light processing (DLP) projection system. In application, other imaging devices may also be used depending on the different kinds of projection systems, and is thus, not limited to the DMD.

As shown in FIG. 3A, in response to the digital data received by the projection system 2, the imaging device 25 generates and projects a first image (not shown) with the first image ratio from the image outlet along the first direction 22a. The extended lens device 231 is adapted to receive the first image and, by means of the rotation mechanism 233, rotate around the first direction 22a to the first position corresponding to the second direction 22b. The image is then reflected by the reflection component 235 and finally projected through the lens to the projection screen as the second image 24a with the second image ratio. The second image 24a is a magnified projection image of the first image, which has substantially the same image ratio as the first image.

On the other hand, as shown in FIG. 3B, if the extended lens device 231 rotates to the second position corresponding to the third direction 22c instead, the reflection component 235 also rotates around the first direction 22a by 90° with respect to the first position corresponding to the second direction 22b. In this case, the third image 24b projected has an image ratio reciprocal to that of the second image, i.e., the third image ratio is reciprocal to the first image ratio. Accordingly, if the first image ratio is 4:3, the second image ratio is also 4:3, but the third image ratio is 3:4. Similarly, if the first image ratio is 16:9, the second image ratio is also 16:9, but the third image ratio is 9:16.

However, what is described above is only for purpose of illustration, and the first image ratio of the digital data inputted may be of other values rather than those stated above. As an example, the value of the first image ratio may be inversed from the aforesaid ones. More specifically, if the first image ratio becomes 3:4 instead, then the second image ratio is either of 3:4 or 4:3 while the third image ratio can be another ratio. Similarly, if the first image ratio is 9:16, then the second image ratio is either 9:16 or 16:9 while the third image ratio can be another ratio. Furthermore, various needs for displaying image can be satisfied by changing the length of the screen to accommodate different image ratios.

In other examples, the extended lens device 231 of the imaging module 23 may further be rotated around the first direction 22a by 360° with respect to the body 21. In this case, the extended lens device 231 may project an image along a fourth direction (not shown), which is perpendicular to the first direction 22a and either the second direction 22b or the third direction 22c. For example, the fourth direction is adapted to be opposite to the second direction 22b or the third direction 22c.

Additionally, the profile of the extended lens device is not merely limited to what is described in the first embodiment. In reference to FIG. 4A, the second embodiment of this invention is depicted therein. What is different from the previous embodiment is the profile of the extended lens device 331. A projection system 3 of this embodiment comprises a body 31, an imaging module 33 and a hinge structure (not shown). The imaging module 33 comprises the extended lens device 331 and a rotation mechanism (not shown). In this embodiment, the rotation mechanism is disposed inside the body 31 and connects the extended lens device 331 with the body 31. A reflection component 335 is disposed inside the extended lens device 331. Upon receiving an image generated by the projection system 3 in a first direction 32a, the imaging module 33 projects the image to the screen along a direction (e.g., the second direction 32b) perpendicular to the first direction 32a. The principles and operations of the second embodiment are identical to those of the first embodiment, and thus will not be further described herein.

Figure 4A:
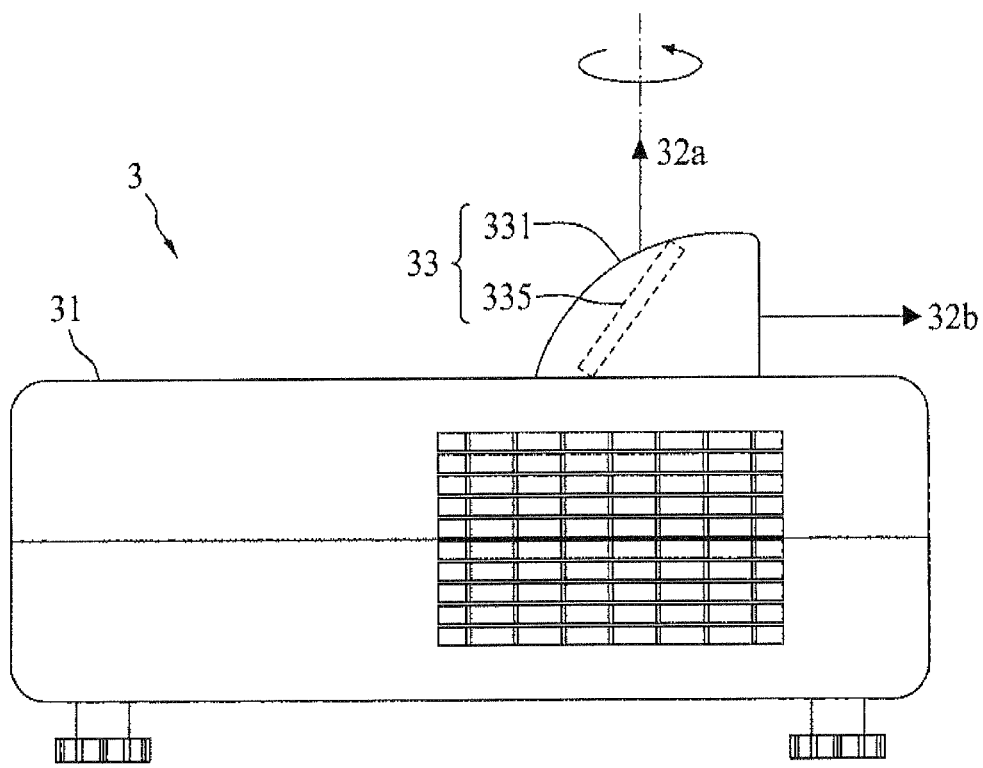
FIG. 4A is a schematic view of an extended lens device according to the second embodiment of this invention at an operating position.
Figure 4B:
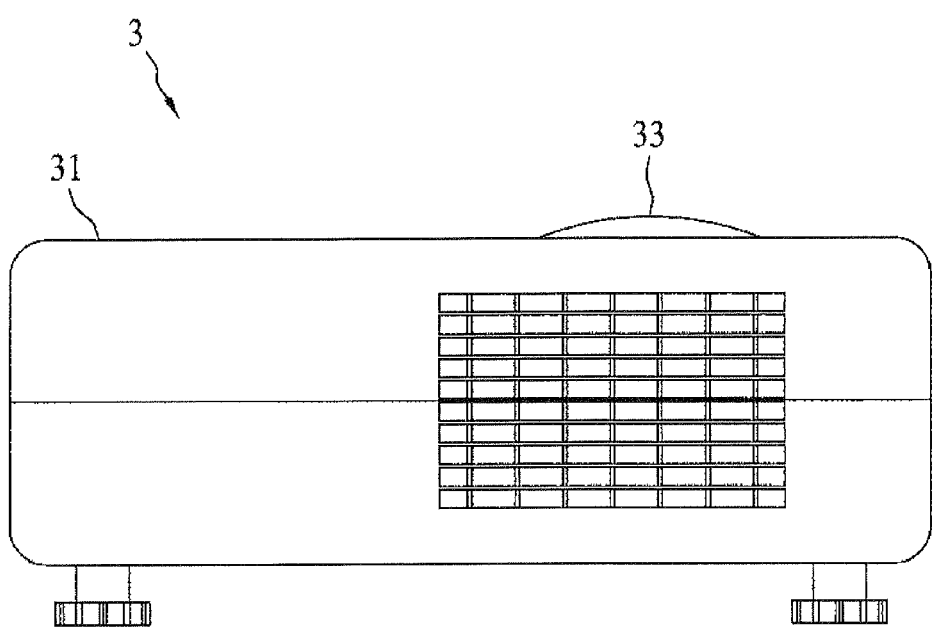
FIG. 4B is a schematic view of the extended lens device according to the second embodiment of this invention in a closed position.

In this embodiment, besides the difference in profile of the extended lens device 331 from that of the first embodiment, the imaging module 33 is also pivoted to the body 31 via a hinge structure (not shown). With this arrangement, the imaging module 33 is able to move between an operating position and a closed position with respect to the body 31. As shown in FIG. 4A, when the projection system 3 is operating, the extended lens device 331 stays at the operating position to project an image along the desired direction. In contrast, when the projection system 3 is not in operation, the extended lens device 331 is retracted automatically or manually by the user for the imaging module 33 at the closed position as shown by FIG. 4B. This helps to reduce the volume of the projection system 3 for convenience of storage. The above description is only for purpose of illustration, and those skilled in the art may devise other structures of the extended lens device depending on the different conditions.

With the imaging module of this invention, the projection system is capable of projecting images selectively along two perpendicular directions by rotating the extended lens device. The images that are projected along the two directions also have image ratios that are reciprocal to each other. Thus, the wide display screen is sufficiently used without having to rotate the body of the projection system or utilize software to scale down the images. As a result, the images may maintain the original image size just by rotating an angle for projection with a large magnification factor. Thus, this invention prevents damage to the bulb due to rotation of the body and improves the heat exchange efficiency by preventing interference with the air flow due to the rotation of the body or from blockage of vent holes. Furthermore, this invention does not need to extend image patterns of certain display ratios to the whole display screen, which would otherwise cause distortion of the images and affect projection quality.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An imaging module for a projection system, the projection system comprising a body and an image outlet formed on the body, the projection system projecting an image from the image outlet of the body along a first direction, the imaging module comprising:
an extended lens device, rotatably connected to the image outlet, the extended lens device receiving the image from the imaging outlet and capable of being rotated from the first direction to one of a second direction and a third direction to selectively project the image onto a screen; wherein any two of the first direction, the second direction and the third direction are substantially perpendicular to each other.

2. The imaging module as claimed in claim 1, wherein the imaging module further comprises a rotation mechanism disposed between the body and the extended lens device to enable the extended lens device to rotate around the first direction with respect to the body.

3. The imaging module as claimed in claim 2, wherein the extended lens device is adapted to be rotated around the first direction between a first position and a second position corresponding to the second direction and the third direction respectively.

4. The imaging module as claimed in claim 2, wherein the extended lens device is adapted to be rotated around the first direction by 360°.

5. The imaging module as claimed in claim 1, wherein the extended lens device comprises a reflection component.

6. The imaging module as claimed in claim 5, wherein the reflection component is a reflection mirror or a prism.

7. The imaging module as claimed in claim 1, wherein the extended lens device comprises at least a lens.

8. The imaging module as claimed in claim 1, wherein the projection system further comprises a hinge structure, and the imaging module joints the body by the hinge structure such that the imaging module operates at an operating position or a closing position with respect to the body.

9. The imaging module as claimed in claim 1, wherein the extended lens device projects the image along a fourth direction, and the fourth direction is perpendicular to the first direction and either the second direction or the third direction.

10. The imaging module as claimed in claim 1, wherein the image has a first image ratio, a second image ratio and a third image ratio when being projected along the first direction, the second direction and the third direction respectively, and the first image ratio is equal to either the second image ratio or the third image ratio and reciprocal to another.

11. The imaging module as claimed in claim 10, wherein the first image ratio is 4:3.

12. The imaging module as claimed in claim 10, wherein the first image ratio is 3:4.

13. The imaging module as claimed in claim 10, wherein the first image ratio is 16:9.

14. The imaging module as claimed in claim 10, wherein the first image ratio is 9:16.

* * * * *